(No Model.)

D. A. SHANK.
HAY FORK.

No. 573,709. Patented Dec. 22, 1896.

Witnesses
D. W. Eaton
R. M. Ross

Inventor
David Abram Shank

THE NORRIS PETERS CO., PHOTO-LITHO., WASHINGTON, D. C.

UNITED STATES PATENT OFFICE.

DAVID ABRAM SHANK, OF VERSAILLES, MISSOURI, ASSIGNOR OF ONE-HALF TO A. L. ROSS, OF SAME PLACE.

HAY-FORK.

SPECIFICATION forming part of Letters Patent No. 573,709, dated December 22, 1896.

Application filed September 14, 1896. Serial No. 605,817. (No model.)

*To all whom it may concern:*

Be it known that I, DAVID ABRAM SHANK, a citizen of the United States, residing at Versailles, Morgan county, Missouri, have invented an Improvement in Double-Harpoon Clover-Hay Forks, of which the following is a specification.

Figure 1:
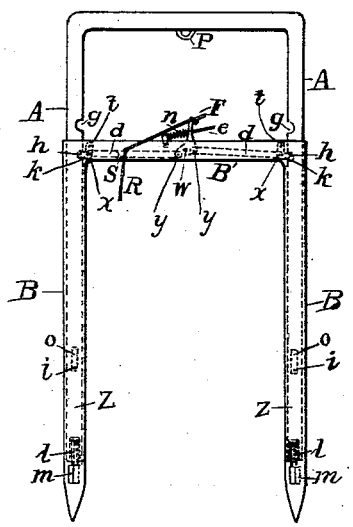
Figure 4:
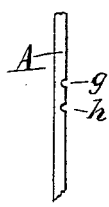
Figure 2:
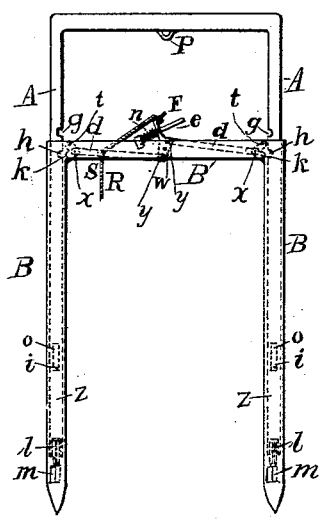
Figure 5:
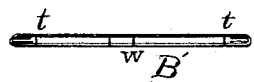
Figure 3:
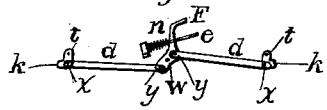

Figure 1 is a side view of the entire fork ready for use. Fig. 2 is a view of the entire fork in the act of being loaded. Fig. 3 shows the single trip-arm, the dogs, rods, the spiral spring, and the manner of connecting said several parts. Fig. 4 is a section of the frame A A, showing notches $g$, which are the same on each side of said frame. Fig. 5 is a vertical view of the double cross-bar B'.

Similar letters refer to similar parts throughout the several views.

The fork consists, essentially, of three principal parts—viz., the upper frame A A, the outer frame, consisting of the posts B B and the double cross-bar B', and the mechanism shown in Fig. 3, consisting of the trip-arm, spring, dogs, and rods. The upper frame A A and the harpoons Z Z work vertically in the outer frame, as in my original invention. $o\ o$ are slots in the harpoons Z Z, which work over the stationary bolts $i\ i$ in the posts B B and serve to hold the harpoons in place.

This improvement, for which invention and originality are herein claimed, consists of the double cross-bar B', the notches $g\ g$ and $h\ h$ in the frame A A, and the mechanism shown in Fig. 3, all of which is hereinafter more fully described. The cross-bar B' is double, consisting of two horizontal bars of strap-iron with intervening space. The notches in A A are designated by $g\ g$ and $h\ h$. $k\ k$ are the dogs working in those notches.

F is the trip-arm.

$d\ d$ are the rods attached to the dogs and to the trip-arm.

R is the rope or wire attached to the trip-arm F.

S is the aperture in one of the rods through which the rope R passes.

$n$ is the spiral spring, used to operate the trip-arm F, and is kept in place by and works upon the rod $e$. The lower end of the rod $e$ works on a bolt passing through the cross-bar B' and its upper end passes through an aperture near the upper end of the trip-arm.

The dogs $k\ k$, the rods $d\ d$, the trip-arm F, and the rod $e$, carrying the spiral spring $n$, (all shown in Fig. 3,) are placed within the open space in the cross-bar B' and are attached as shown in Figs. 1 and 2. The dogs work on the bolts $t\ t$, passing through both sides of the cross-bar. The lower end of the trip-arm F works within the cross-bar on the bolt $w$, passing through the cross-bar. The bolts $t\ t$ and $w$ are more perfectly shown in Fig. 5. The rods $d\ d$ are attached to the dogs $k\ k$ by the bolts $x\ x$ and to the trip-arm by the bolts $y\ y$.

The fork is operated as follows: As seen in Fig. 1, it is pressed down into the hay. Hand-pressure is then applied to the trip-arm and motion is thereby communicated to the rods and dogs, and the dogs are thereby thrown out of the notches $h\ h$, and the harpoons Z Z descend, throwing the prongs or tines $l\ l$ out through the openings $m\ m$ into the hay. The spring $n$ throws the trip-arm back as soon as the pressure of the hand is removed, causing the dogs to enter the upper notches $g\ g$ as soon as the upper frame descends sufficiently, and the fork is loaded and locked. It is then hoisted into the hay-mow or onto the stack by means of the hoisting-rope, attached at P. It is unloaded by pulling on the trip-rope R, which removes the dogs from the notches $g\ g$. Immediately the outer frame descends till the lower notches $h\ h$ are caught by the dogs $k\ k$, and the fork is unloaded.

The aforesaid improvement supplies the place of the double trip-arms, shuttles, and springs forming a part of my said original invention and greatly simplifies the mechanism of the fork and its operation.

What I claim as my invention and as an improvement in double-harpoon hay-forks, and especially upon my Patent No. 499,258, and desire to secure by Letters Patent, is—

In a hay-fork, the combination of the opposite posts, harpoons provided with notches working therein, a double cross-bar connecting said posts, a spring-pressed trip-arm pivoted between said cross-bars, dogs pivoted between said cross-bars, and rods connecting said trip-arm and pivoted dogs, whereby the dogs are thrown into and out of connection with said notches when said trip-arm is actuated, substantially as described.

DAVID ABRAM SHANK.

Witnesses:
D. W. EATON,
R. M. ROSS.